United States Patent
Pustovalov et al.

(10) Patent No.: US 8,989,325 B2
(45) Date of Patent: Mar. 24, 2015

(54) MULTI-MODE FREQUENCY DOMAIN EQUALIZATION WITH ADAPTATION TO VARYING CHANNEL CONDITIONS

(75) Inventors: Evgeny Pustovalov, Saint-Petersburg (RU); Evgeny Bakin, Saint-Petersburg (RU); Andrey Turlikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,362

(22) PCT Filed: Jan. 30, 2012

(86) PCT No.: PCT/RU2012/000042
§ 371 (c)(1),
(2), (4) Date: Jun. 5, 2014

(87) PCT Pub. No.: WO2013/115666
PCT Pub. Date: Aug. 8, 2013

(65) Prior Publication Data
US 2014/0294055 A1  Oct. 2, 2014

(51) Int. Cl.
*H04B 1/10* (2006.01)
*H04L 25/02* (2006.01)
(Continued)

(52) U.S. Cl.
CPC ........ *H04L 25/0202* (2013.01); *H04L 25/0236* (2013.01); *H04L 25/0307* (2013.01);
(Continued)

(58) Field of Classification Search
USPC .......................................... 375/350
See application file for complete search history.

(56) References Cited

U.S. PATENT DOCUMENTS 6,064,655 A    5/2000  Murphy
6,700,919 B1   3/2004  Papasakellariou
(Continued)

FOREIGN PATENT DOCUMENTS

EP   0 717 559 A2   6/1996
EP   1 294 150 A2   3/2003
(Continued)

OTHER PUBLICATIONS

Notice of Allowance received for Japanese Patent Application No. 2012-010985, mailed on Jul. 23, 2013, 1 page of NOA only.
(Continued)

*Primary Examiner* — Erin File
(74) *Attorney, Agent, or Firm* — Garrett IP, LLC

(57) ABSTRACT

Methods and systems to configure a receiver based on a channel condition. A system may be implemented to estimate a channel based on PN sequences in a received signal, concurrently equalize a frequency domain representation of the signal with multiple blind adaptive equalizers, and evaluate results of the equalizations to select coefficients of one of the equalizers for further processing. A first equalizer may implement a constant-step-size (CSS) algorithm for a static channel. A second equalizer may implement a variable-step-size (VSS) algorithm for a dynamic channel. Static and dynamic channels may be distinguished based on convergence/divergence of the equalizers, which may be determined from a mean square error estimated from PN sequences in results of the blind equalizations. Subsequent processing may include linear and/or directed-decision equalization, channel estimation, and turbo equalization, which may be performed in the frequency domain, and which may be configurable based on the channel condition.

20 Claims, 13 Drawing Sheets

(51) Int. Cl.
  *H04L 25/03* (2006.01)
  *H04N 5/21* (2006.01)
  *H04N 5/44* (2011.01)
  *H04N 21/426* (2011.01)

(52) U.S. Cl.
  CPC ............ *H04L25/03159* (2013.01); *H04N 5/21* (2013.01); *H04N 5/4401* (2013.01); *H04N 21/42607* (2013.01); *H04L 2025/03579* (2013.01); *H04L 2025/03656* (2013.01); *H04L 2025/03732* (2013.01); *H04L 2025/03636* (2013.01)
  USPC ............................ 375/350; 375/346; 375/316

(56) References Cited

U.S. PATENT DOCUMENTS

| | | | |
|---|---|---|---|
| 7,027,500 B1* | 4/2006 | Casas et al. | 375/232 |
| 2003/0058951 A1 | 3/2003 | Thomson et al. | |
| 2003/0095529 A1* | 5/2003 | Petre et al. | 370/342 |
| 2004/0125863 A1 | 7/2004 | Ghosh | |
| 2005/0207477 A1* | 9/2005 | Monsen | 375/147 |
| 2005/0271016 A1 | 12/2005 | Kim et al. | |
| 2006/0274861 A1* | 12/2006 | Langenbach et al. | 375/341 |
| 2007/0133672 A1 | 6/2007 | Lee et al. | |
| 2009/0245338 A1 | 10/2009 | Jonsson | |
| 2010/0128774 A1 | 5/2010 | Wei | |
| 2010/0232491 A1 | 9/2010 | Hayashi | |
| 2011/0069742 A1 | 3/2011 | Narayan et al. | |
| 2011/0201269 A1 | 8/2011 | Hobbs et al. | |
| 2013/0259113 A1* | 10/2013 | Kumar | 375/233 |
| 2014/0086299 A1 | 3/2014 | Pustovalov et al. | |

FOREIGN PATENT DOCUMENTS

| | | |
|---|---|---|
| EP | 1 584 168 B1 | 1/2007 |
| GB | 2 449 554 A | 11/2008 |
| JP | 2003-152603 A | 5/2003 |
| JP | 2006-352218 A | 12/2006 |
| JP | 2010-087707 A | 4/2010 |
| WO | 2009/099092 A1 | 8/2009 |
| WO | 2012/134319 A1 | 10/2012 |
| WO | 2013/100781 A1 | 7/2013 |
| WO | 2013/115666 A1 | 8/2013 |
| WO | 2013/147634 A1 | 10/2013 |
| WO | 2013/172729 A1 | 11/2013 |

OTHER PUBLICATIONS

Office Action received for Japanese Patent Application No. 2012-010985, mailed on Jun. 18, 2013, 2 Pages of Office Action and 2 Pages of English Translation.

International Preliminary Report on Patentability and Written Opinion received for PCT Patent Application No. PCT/RU2011/000201, mailed on Oct. 10, 2013, 11 pages.

International Search Report and Written Opinion received for PCT Patent Application No. PCT/RU2011/000201, mailed on Jun. 13, 2012, 16 pages.

International Preliminary Report on Patentability and Written Opinion received for PCT Patent Application No. PCT/RU2011/001047, mailed on Jul. 10, 2014, 9 pages.

International Search Report and Written Opinion received for PCT Patent Application No. PCT/RU2011/001047, mailed on Sep. 21, 2012, 14 pages.

International Search Report and Written Opinion received for PCT Patent Application No. PCT/RU2012/000042, mailed on Oct. 11, 2012, 13 pages.

International Search Report and Written Opinion received for PCT Patent Application No. PCT/RU2012/000236, mailed on Jan. 25, 2013, 12 pages.

International Search Report and Written Opinion received for PCT Patent Application No. PCT/RU2012/000382, mailed on Feb. 14, 2013, 8 pages.

ATSC, "ATSC Digital Television Standard—Part 2: RF/Transmission System Characteristics", Advanced Television Systems Committee, Doc. A/53 Part 2, Dec. 15, 2011, pp. 1-28.

ATSC, "ATSC Recommended Practice: Receiver Performance Guidelines", Advanced Television Systems Committee, Inc.; Document A/74:2010, Apr. 7, 2010, pp. 1-88.

Banovic, Kevin, "Adaptive Equalization: A Tutorial", Research Centre for Integrated Microsystems—University of Windsor, Oct. 14, 2005, 25 pages.

Benvenuto, et al., "Single Carrier Modulation With Nonlinear Frequency Domain Equalization: An Idea Whose Time Has Come Again", Proceedings of the IEEE, vol. 98, Issue 1, Jan. 1, 2010, New York, US, pp. 69-96.

Garg, Ravi, "Adaptive Equalization Techniques using Least Mean Square (LMS) algorithm", Electrical Engineering, Term Paper, Sep. 12, 2009, 11 pages.

Hatae, et al., "Comparing single and multiple carrier schemes using channel coding", 11th International OFDM-Workshop InOWo, Aug. 30-31, 2006, 5 pages.

Hong, et al., "Iterative Frequency-Domain Channel Estimation and Equalization for Single-Carrier Transmissions without Cyclic-Prefix", IEEE Transactions on Wireless Communications, IEEE Service Center Piscataway, NJ, US vol. 7, No. 10,XP011236893, pp. 3686-3691.

Joel, et al., "Adaptive Decision Feedback Equalization: Can You Skip the Training Period", IEEE Transactions on Communications, IEEE Service Center Piscataway, NJ. USA,vol. 46, No. 7, Jul. 1998, pp. 921-930.

Mackenzie, "Presentation", Mackenzie HDTV NEC, ABERTSET Feb. 5, 2000, 282 pages.

Mendes, et al., "MI-SBTVD: A Proposal for the Brazilian Digital Television System SBTVD", Journal of the Brazilian Computer Society ISSN 0104-6500, J. Braz. Comp. Soc. vol. 12, No. 4, Mar. 2007, pp. 57-82.

Pancaldi, et al., "Single-Carrier Frequency Domain Equalization", IEEE Signal Processing Magazine, IEEE Service Center, vol. 25, Issue 5, Sep. 1, 2008, Piscataway, NJ, US, pp. 37-56.5, Piscataway, NJ, US, pp. 37-56.

Sohail, et al., "A Non-Iterative Channel Estimation and Equalization Method for TDS-OFDM Systems", Wireless Communications and Mobile Computing Conference (IWCMC), 7th International, Jul. 4-8, 2011, 5 pages.

Ta-Hong, et al., "Decision Feedback Equalizer", Version 1.4: Nov. 14, 2007, pp. 1-2.

Takeda, et al., "Joint Tomlinson-Harashima Precoding and Frequency-Domain Equalization for Broadband Single-Carrier Transmission", IEICE Trans. Commun., vol. E91-B, No. 1, Jan. 2008, pp. 258-266.

Wang, et al., "Design and implementation of frequency domain equalizer for ATSC system", Broadband Multimedia Systems and Broadcasting, 2008 IEEE International Symposium on IEEE, Piscataway. NJ. USA,XP031268564, pp. 1-6.

Wu, et al., "Low Complexity Adaptive Turbo Frequency-Domain Channel Estimation for Single-Carrier Multi-User Detection", IEEE Transactions on Wireless Communications, IEEE Service Center, vol. 7, Issue 11, Nov. 1, 2008, Piscataway, NJ, US, pp. 4094-4099.

Yasmin, et al., "Blind Channel Equalization in Impulse Noise", International Journal of Communications, Issue 3, vol. 5, 2011, pp. 132-140.

Zarzoso, et al., "Blind Channel Equalization With Algebraic Optimal Step Size", EUSIPCO-2005, Antalya, Turkey, Sep. 4-8, 2005, pp. 1-4.

Zarzoso, et al., "Semi-Blind Constant Modulus Equalization With Optimal Step Size", ICASSP-2005, Philadelphia, PA, Mar. 18-23, 2005, pp. 1-4.

\* cited by examiner

| Name | $B_c$[kHz] | Parameter | Path 1 | Path 2 | Path 3 | Path 4 | Path 5 | Path 6 |
|---|---|---|---|---|---|---|---|---|
| Brazil A | 13.75 | Delay (µs) | 0 | 0.15 | 2.22 | 3.05 | 5.86 | 5.93 |
| | | Atten. (dB) | 0 | 13.8 | 16.2 | 14.9 | 13.6 | 16.4 |
| | | Phase | 0° | 0° | 0° | 0° | 0° | 0° |
| Brazil B | 8.98 | Delay (µs) | 0 | 0.3 | 3.5 | 4.4 | 9.5 | 12.7 |
| | | Atten. (dB) | 0 | 12 | 4 | 7 | 15 | 22 |
| | | Phase | 0° | 0° | 0° | 0° | 0° | 0° |
| Brazil C | 18.43 | Delay (µs) | 0 | 0.089 | 0.419 | 1.506 | 2.322 | 2.799 |
| | | Atten. (dB) | 2.8 | 0 | 3.8 | 0.1 | 2.5 | 1.3 |
| | | Phase | 0° | 0° | 0° | 0° | 0° | 0° |
| Brazil D | 8.51 | Delay (µs) | 0.15 | 0.63 | 2.22 | 3.05 | 5.86 | 5.93 |
| | | Atten. (dB) | 0.1 | 3.8 | 2.6 | 1.3 | 0 | 2.8 |
| | | Phase | 0° | 0° | 0° | 0° | 0° | 0° |
| Brazil E | 1.91 | Delay (µs) | 0 | 1 | 2 | - | - | - |
| | | Atten. (dB) | 0 | 0 | 0 | - | - | - |
| | | Phase | 0° | 0° | 0° | - | - | - |

MULTI-MODE FREQUENCY DOMAIN EQUALIZATION WITH ADAPTATION TO VARYING CHANNEL CONDITIONS

BACKGROUND

A channel may be defined in terms of effects imparted to a signal propagated over the channel, such as inter-symbol interference (ISI), multi-path, Doppler effect, and/or noise.

An adaptive equalizer and/or channel estimator may adapt filter coefficients or weights until an optimum set of coefficients is determined for a channel. A speed or rate of convergence toward the optimum set may depend on increments by which the coefficients are adjusted, or step size. Adaptive equalization and/or channel estimation may be performed with a constant step size (CSS) algorithm or a variable step size (VSS) algorithm.

A receiver may be suitable for some channel conditions may not be as suitable for other channel conditions. For example, an adaptive CSS blind equalizer may be suitable for a relatively static channel (i.e., little or no Doppler effect), which may found in a suburban or rural setting, but may not converge well for a dynamic channel, such as in an urban setting. An adaptive VSS blind equalizer may converge for static and dynamic channels, but may incur greater losses with respect to static channels relative to an adaptive CSS blind equalizer A receiver may be implemented with additional to operate under a variety of channel conditions, but may incur penalties in terms of added complexity, cost, area consumption, and/or power consumption.

BRIEF DESCRIPTION OF THE DRAWINGS/FIGURES

FIG. 5 is a chart of channel delay profiles of the Brazil channels.

Figure 1:
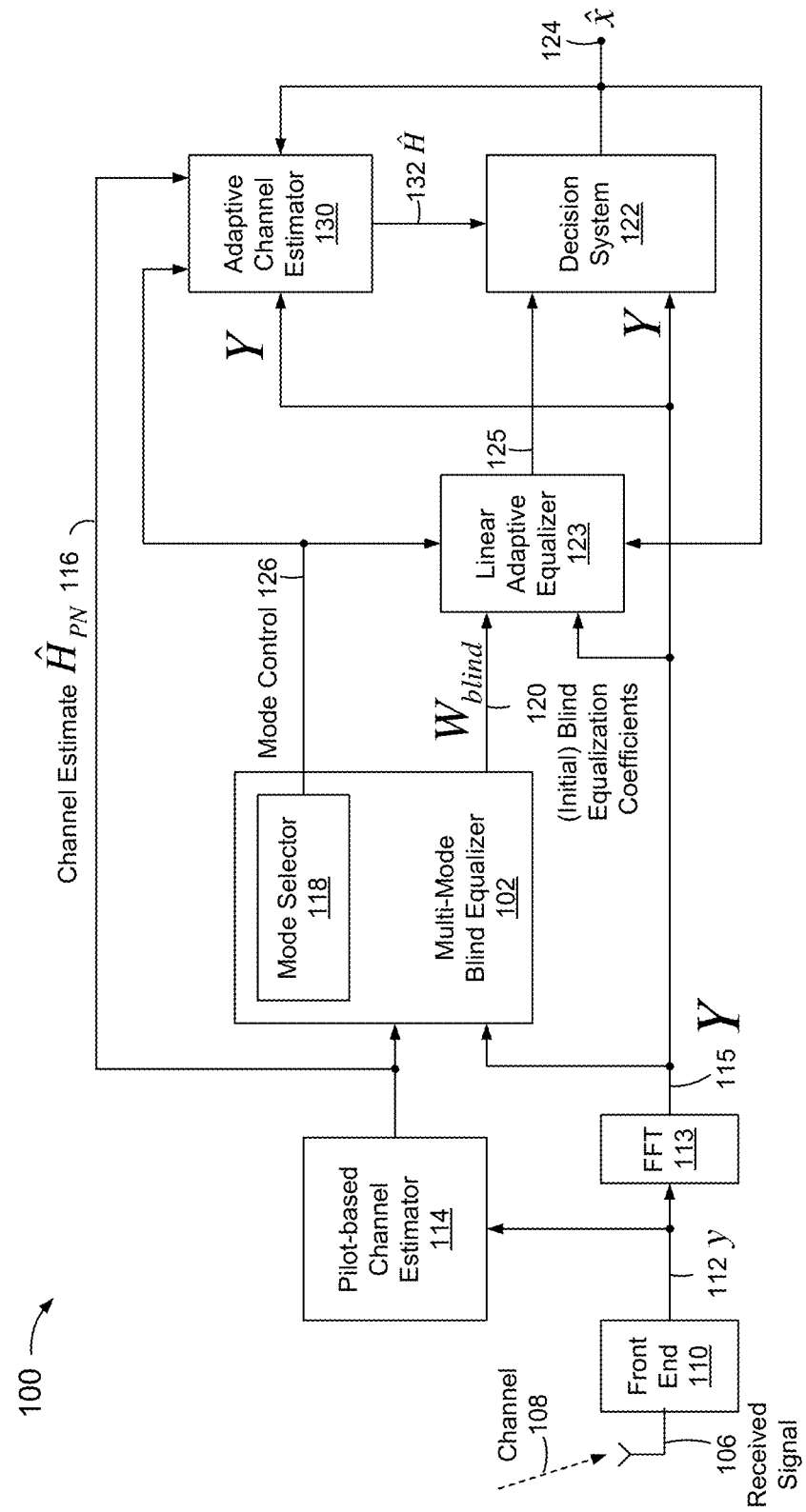
FIG. 1 is a block diagram of a system to generate decisions regarding symbols of a signal received over a channel using multiple equalization techniques optimized to various channel conditions.

In the drawings, the leftmost digit(s) of a reference number identifies the drawing in which the reference number first appears.

DETAILED DESCRIPTION

FIG. 1 is a block diagram of a system 100 to generate decisions 124 regarding symbols of a signal 106 using multiple equalization techniques optimized to various channel conditions.

Signal 106 may be received over a channel 108, which may include a wired and/or wireless channel.

Signal 106 may represent a single-carrier signal, such as a digital television broadcast signal, which may be formatted in accordance with a digital television (DTV) standard promulgated by the Advanced Television Systems Committee (ATSC), based in Washington, D.C. Methods and systems disclosed herein are not, however, limited to these examples.

System 100 may include a front end system 110 to frequency down-convert and sample signal 106. An output 112 of front end system 100 may include time domain samples y 112 of received signal 106.

System 100 may include a fast Fourier transfer (FFT) module 113 to translate time domain samples y 112 to a frequency domain representation Y 115.

Characteristics of channel 108 of may impact symbols of signal 106, such as to rotate constellations of the symbols.

System 100 may be implemented to estimate channel 108 and to correct signal 106 based on the channel estimate as described below.

System 100 may include a channel estimator 114 to generate an estimate $\hat{H}_{PN}$ 116 of the frequency response of channel 108 based on features of signal 106, such as pilot signals of signal 106, which may include pseudo-random (PN) sequences.

For a relatively long channel response, a pilot sequence may be too short to correctly estimate a channel. For a time-varying channel, an interval between pilot sequences may be too long to correctly estimate the channel.

Channel estimate $\hat{H}_{PN}$ 116 may serve as an initial channel estimate to determine initial or starting weights of a multi-mode blind equalizer 102, which may in turn be used to generate initial weights $W_{blind}$ 120 of a linear adaptive equalizer 123, and/or may be used as an initial channel estimate of an adaptive channel estimator as described further below.

Channel estimate $\hat{H}_{PN}$ 116 may be used to generate initial weights of blind equalizer 102 as:

$$W_{PN} = \frac{1}{\hat{H}_{PN}} \qquad \text{EQ. (1)}$$

Multi-mode blind equalizer 102 may be implemented to converge frequency-domain equalizer weights $W_{blind}$ 120 based on one or more of multiple selectable blind equalization techniques, which may include techniques suitable for different channel conditions.

Multi-mode blind equalizer 102 may include one more frequency domain-based adaptive blind equalizers, which may include a constant modulus algorithm (CMA) based equalizer, a Sato algorithm based equalizer, and/or a multi-modulus algorithm (MMA) based equalizer. Multi-mode blind equalizer 102 may include an equalizer to implement a constant step size (CSS) algorithm and/or variable step size (VSS) algorithm. Multi-mode blind equalizer 102 is not, however, limited to these examples.

Multi-mode blind equalizer 102 may include a mode selector 118 to select equalizer weights or coefficients of one of the multiple blind equalizers as initial frequency-domain equalizer coefficients $W_{blind}$ 120 of linear adaptive equalizer 123, based on condition of channel 108. Mode selector 118 may be implemented to distinguish between multiple pre-defined channel types, such as between static and dynamic channels.

The multiple blind equalizers may be implemented to run concurrently, and mode selector 118 may be implemented to dynamically select weights from one of the multiple blind equalizers based on changing channel conditions.

Linear adaptive equalizer 123 may be implemented to equalize frequency domain representation Y 115 of input signal 112, and to output time domain samples 125 to a decision system 122.

Linear adaptive equalizer 123 may use blind equalizer coefficients $W_{blind}$ 120 as starting or initial equalization coefficients, and may adapt blind equalizer coefficients $W_{blind}$ 120 by a least means squares (LMS) algorithm based on an error of output 125.

Linear adaptive equalizer 123 may be implemented as a decision-directed equalizer.

Linear adaptive equalizer 123 may be implemented to operate in one of multiple selectable modes based on mode control 126. For example, where multi-mode blind equalizer 102 includes a CSS adaptive blind equalizer and a VSS adaptive blind equalizer, linear adaptive equalizer 123 may be implemented to operate in a corresponding one of CSS mode and a VSS mode.

System 100 may include an adaptive channel estimator 130 generate an estimate $\hat{H}$ 132 of channel 108. Channel estimator 130 may use PN-based channel estimate $\hat{H}_{PN}$ 116 as an initial channel estimate, and may include a decision-directed adaptive algorithm to adapt the initial channel estimate.

Adaptive channel estimator 130 may be implemented to operate in one of multiple selectable modes based on mode control 126. For example, where multi-mode blind equalizer 102 includes a CSS adaptive blind equalizer and a VSS adaptive blind equalizer, adaptive channel estimator 130 may be implemented to operate in a corresponding one of CSS mode and a VSS mode.

Decision system 122 may be implemented to generate decisions 124 as soft decisions and/or hard decisions. Example implementations of decision system 122 are described further below with reference to FIG. 11.

Figure 2:
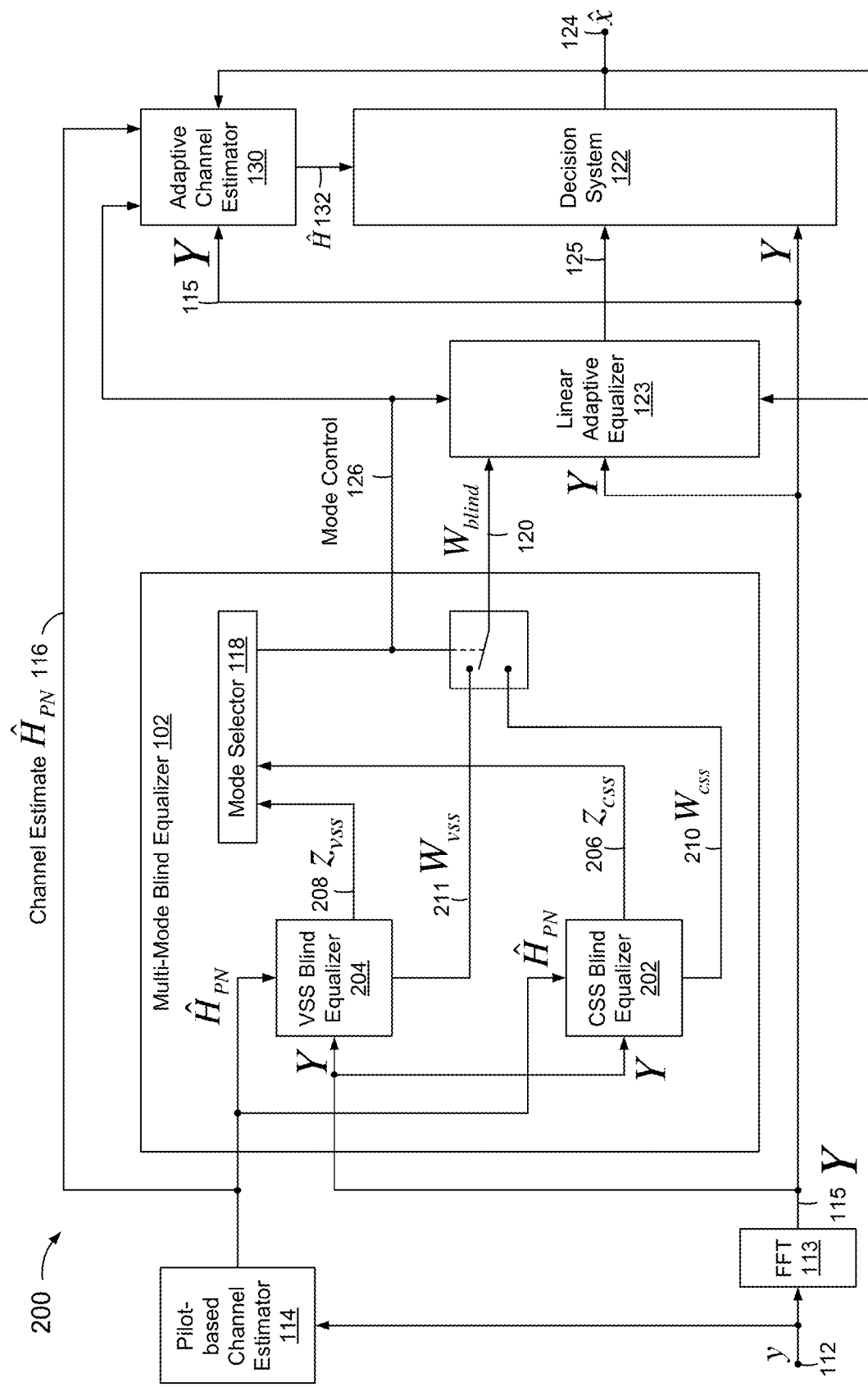
FIG. 2 is a block diagram of a system including an example implementation of the multi-mode blind equalizer of FIG. 1.

FIG. 2 is a block diagram of a system 200, including an example implementation of multi-mode blind equalizer 102. Methods and systems disclosed herein are not, however, limited to the example of FIG. 2.

In FIG. 2, multi-mode blind equalizer 102 includes a CSS adaptive blind equalizer (CSS equalizer) 202 and a VSS adaptive blind equalizer (VSS equalizer) 204.

CSS equalizer 202 and/or VSS equalizer 204 may be implemented to perform a CMA algorithm or a Sato algorithm.

CSS equalizer 202 and VSS equalizer 204 may be implemented to equalize frequency tones Y 116 in the frequency domain.

CSS equalizer 202 may be useful or suitable for a relatively static channel having little or no Doppler effect, such as in a suburban or rural setting.

VSS equalizer 204 may be useful or suitable for a dynamic channel, such as in an urban setting and/or a mobile receiver.

VSS equalizer 204 may also be useful for a static channel, but with potentially lower gain and/or lower signal-to-noise ratio (SNR) relative to CSS equalizer 202.

CSS equalizer 202 may be implemented to converge equalization weights $W_{CSS}$ 210 using a constant step size blind algorithm, and to output corresponding frequency domain tones $z_{CSS}$ 206 and weights $W_{CSS}$ 210.

VSS equalizer 204 may be implemented to converge equalization weights $W_{VSS}$ 211 using a variable step size blind algorithm, and to output corresponding frequency domain tones $z_{VSS}$ 208 and weights $W_{VSS}$ 211.

In FIG. 2, mode selector 118 may be implemented to select weights $W_{CSS}$ 210 of CSS equalizer 202 as final weights $W_{blind}$ 120 of blind equalizer 102 when channel 108 is relatively static.

Mode selector 118 may be further implemented to select weights $W_{VSS}$ 211 of VSS equalizer 204 as final weights $W_{blind}$ 120 of blind equalizer 102 when channel 108 is dynamic.

Mode selector 118 may be implemented to evaluate output $z_{CSS}$ 206 and/or output $z_{VSS}$ 208 to distinguish between a static channel and a dynamic channel. The evaluation may be based on a mean square error (MSE), which may be estimated from PN sequences on output $z_{CSS}$ 206 and/or output $z_{VSS}$ 208, such as described below with reference to FIGS. 3 and 4.

Figure 3:
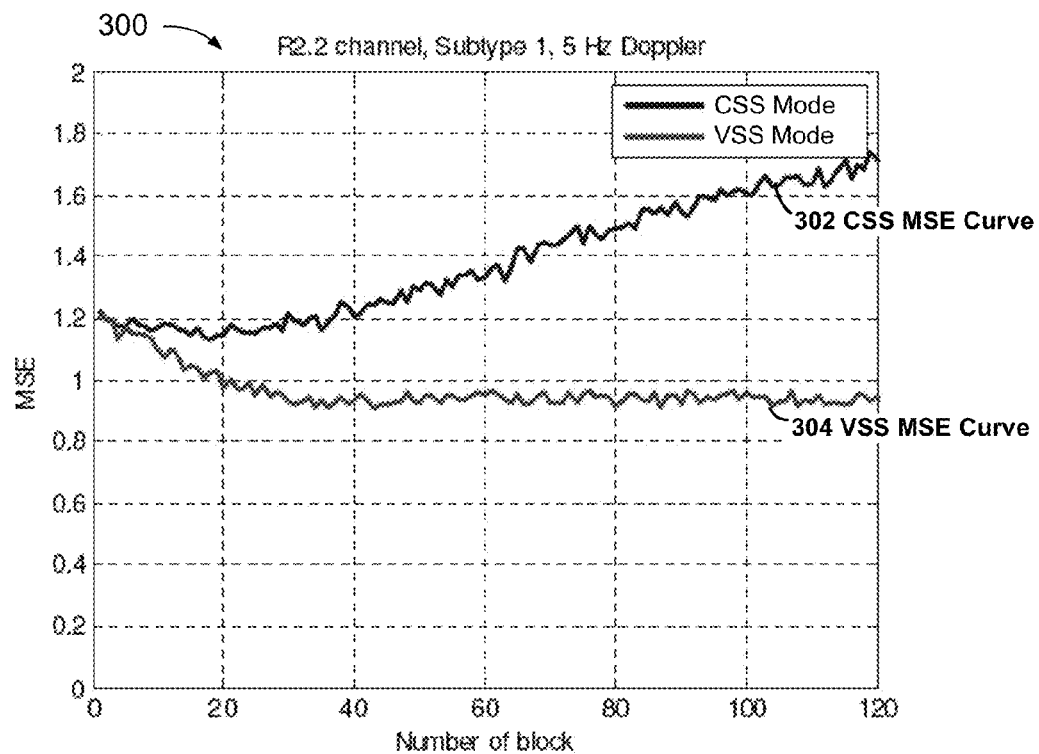
FIG. 3 is a plot of a mean square error curves.

FIG. 3 is a plot 300 of a MSE curve 302 for an output of an adaptive frequency domain CSS blind equalizer, and a MSE curve 304 for an output of an adaptive frequency domain VSS blind equalizer. Curves 302 and 304 correspond to a signal received over a dynamic channel, illustrated here as an ATSC R2.2, type #1 channel.

ATSC R2.2 type #1 is one of a series of multiple dynamic echo ensembles or test conditions published in "ATSC Recommended Practice: Receiver Performance Guidelines," Document A/74:2010, Apr. 7, 2010. The document is available at www.atsc.org/cms/standards/a_74-2010.pdf.

Page 25 of the ATSC document includes a table of R2.2 ensembles, which is reproduced below as Table 1.

TABLE 1

| Ensemble | | Path 1 | Path 2 | Path 3 | Path 4 | Path 5 | Path 6 |
|---|---|---|---|---|---|---|---|
| Relative | #1 | 0 | 15 | 15 | 7 | 7 | 15 |
| Attenuation | #2 | 0 | 8 | 3 | 4 | 3 | 12 |
| (dB) | #3 | 0 | 3 | 1 | 1 | 3 | 9 |

TABLE 1-continued

| Ensemble | Path 1 | Path 2 | Path 3 | Path 4 | Path 5 | Path 6 |
|---|---|---|---|---|---|---|
| Delay (μsec) | | −1.8 | 0.15 | 1.8 | 5.7 | 39.8 |
| Phase or Doppler | 0 | 125° | 80° | 45° | Variable (0-5 Hz) | 90° |
| White Gaussian Noise | | | Variable | | | |

Figure 4:
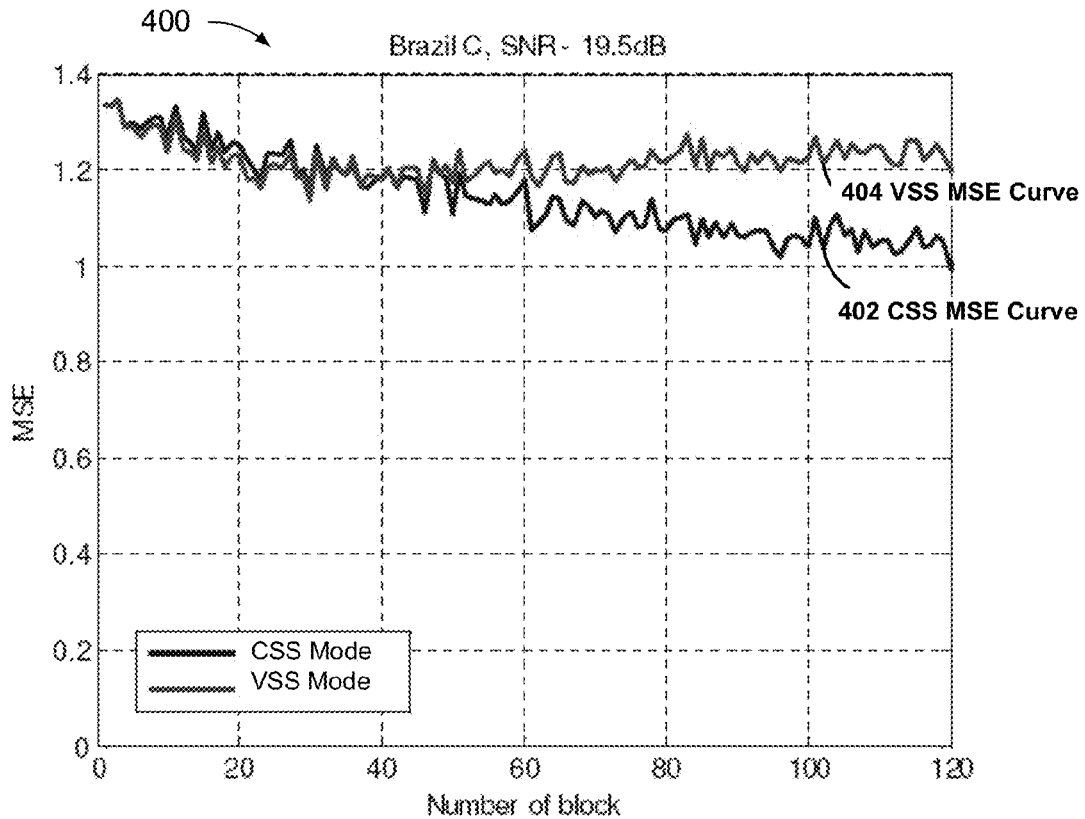
FIG. 4 is another plot of a mean square error curves.

FIG. 4 is a plot 400 of a MSE curve 402 for an output of an adaptive frequency domain CSS blind equalizer, and a MSE curve 404 for an output of an adaptive frequency domain VSS blind equalizer. Curves 402 and 404 correspond to a signal received over a static channel, illustrated here as a Brazil channel C having a SNR of −19.5 dB.

Brazil channels are references for digital television (DTV) systems. Table 2 below provides a brief description of Brazil channels. FIG. 5 is a chart 500 of channel delay profiles of the Brazil channels of Table 2.

TABLE 2

| Brazil Channel | Description |
|---|---|
| Brazil A | Simulates small echoes and short delays, and may represent a channel with line-of-sight in a flat terrain. |
| Brazil B | Represents a debilitated reception with external antenna. |
| Brazil C | Represents reception conditions in an environment with mountains and no line-of-sight. |
| Brazil D | Represents reception conditions with internal antenna. |
| Brazil E | Represents reception conditions in a single frequency network environment. |

Under the dynamic channel conditions of FIG. 3, VSS MSE curve 304 settles to approximately 1.0, indicating that the VSS blind equalizer converges. CSS MSE curve 302, on the other hand, increases with increasing numbers of blocks, indicating that the CSS equalizer is unable to converge, or diverges.

Under the static channel conditions of FIG. 4, on the other hand, CSS MSE curve 402 and VSS MSE curve 404 indicate convergence.

As evidenced by the plots of FIGS. 3 and 4, static and dynamic channels may be distinguished from one another based on convergence/divergence, which may be determined from the MSE of the output of an adaptive frequency domain CSS blind equalizer, such as output $z_{CSS}$ 206 in FIG. 2.

In FIG. 2, mode selector 118 may be implemented to compute or estimate the MSE of CSS equalizer output $z_{CSS}$ 206 and/or VSS equalizer output $z_{VSS}$ 208, and to select equalizer weights $W_{CSS}$ 210 or $W_{VSS}$ 211 as starting weights $W_{blind}$ 120 for linear adaptive equalizer 123 based on the MSE(s). The MSE(s) may be computed or estimated from PN sequences on output $z_{CSS}$ 206 and/or output $z_{VSS}$ 208.

Mode selector 118 may be implemented to select weights $W_{CSS}$ 210 when the MSE is below a threshold, and/or based on a comparison of MSEs of outputs $z_{CSS}$ 206 and $z_{VSS}$ 208.

While an adaptive frequency domain VSS blind equalizer may be suitable for static and dynamic channels, FIGS. 6 through 10 illustrate that a multi-mode equalizer as disclosed herein may result in lower bit error rate (BER) and/or higher gains over a range of channel conditions.

Figure 6:
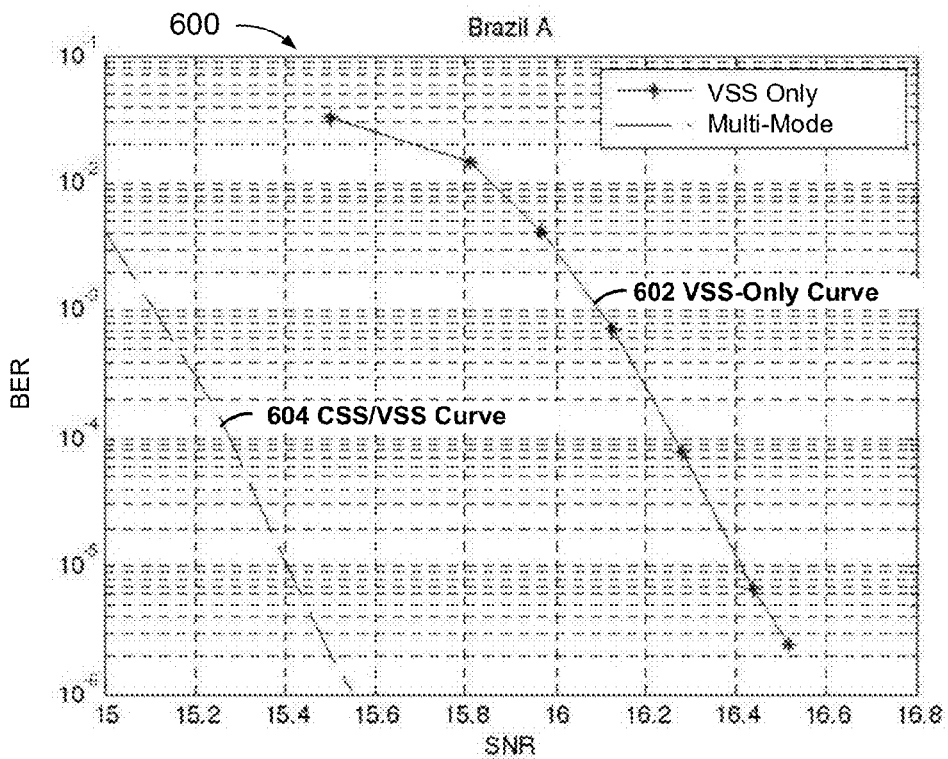
FIG. 6 is a plot of a BER/SNR curves for a receiver with VSS-only equalization and a receiver with CSS/VSS multi-mode equalization, for a Brazil channel A.

FIG. 6 is a plot 600 of a BER/SNR curve 602 for a receiver with VSS-only equalization, and a BER/SNR curve 604 for a receiver with CSS/VSS multi-mode equalization for a Brazil channel A.

Figure 7:
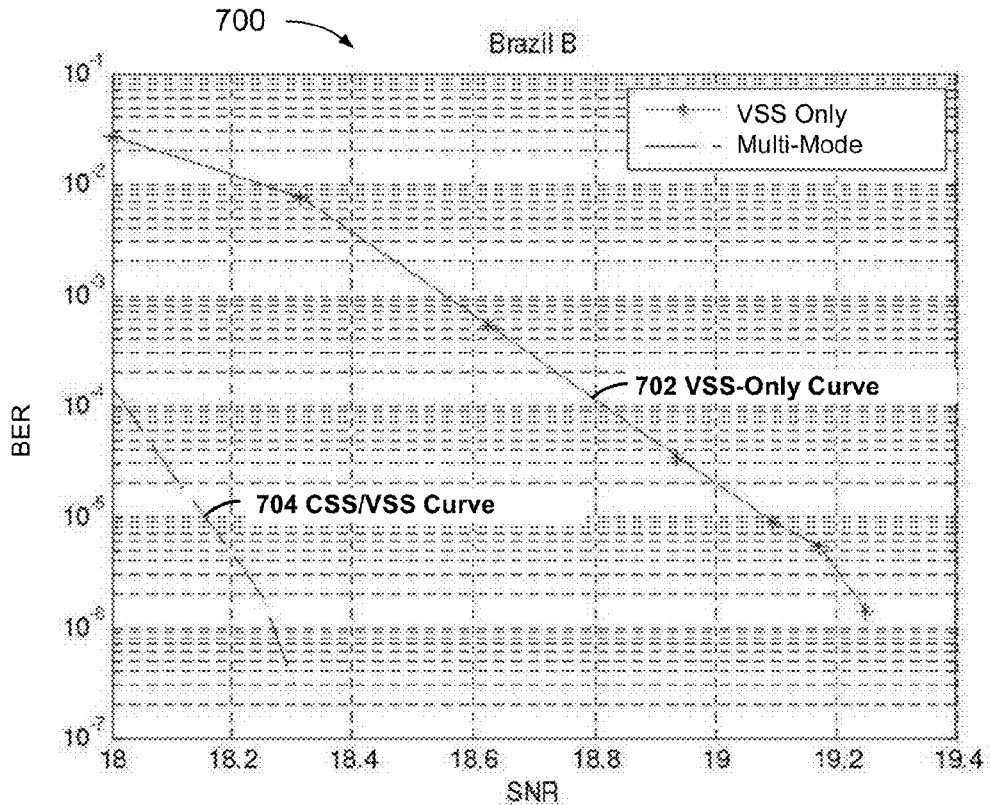
FIG. 7 is a plot of a BER/SNR curves for a receiver with VSS-only equalization and a receiver with CSS/VSS multi-mode equalization, for a Brazil channel B.

FIG. 7 is a plot 700 of a BER/SNR curve 702 for a receiver with VSS-only equalization, and a BER/SNR curve 704 for a receiver with CSS/VSS multi-mode equalization, for a Brazil channel B.

Figure 8:
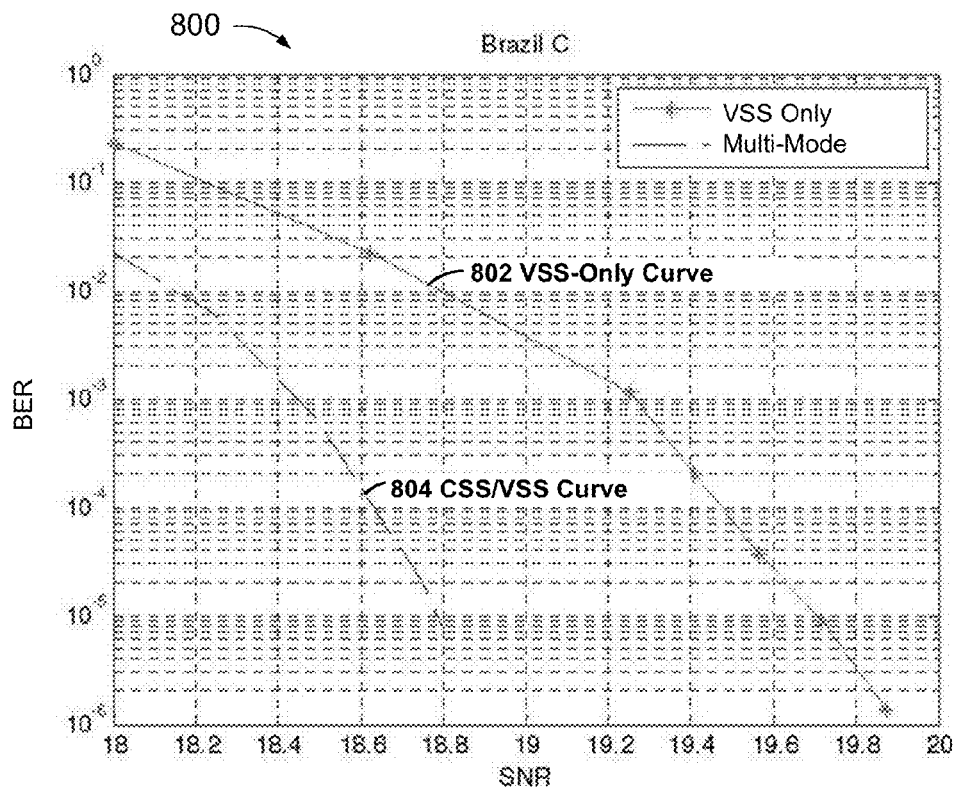
FIG. 8 is a plot of a BER/SNR curves for a receiver with VSS-only equalization and a receiver with CSS/VSS multi-mode equalization for a Brazil channel C.

FIG. 8 is a plot 800 of a BER/SNR curve 802 for a receiver with VSS-only equalization, and a BER/SNR curve 804 for a receiver with CSS/VSS multi-mode equalization, for a Brazil channel C.

Figure 9:
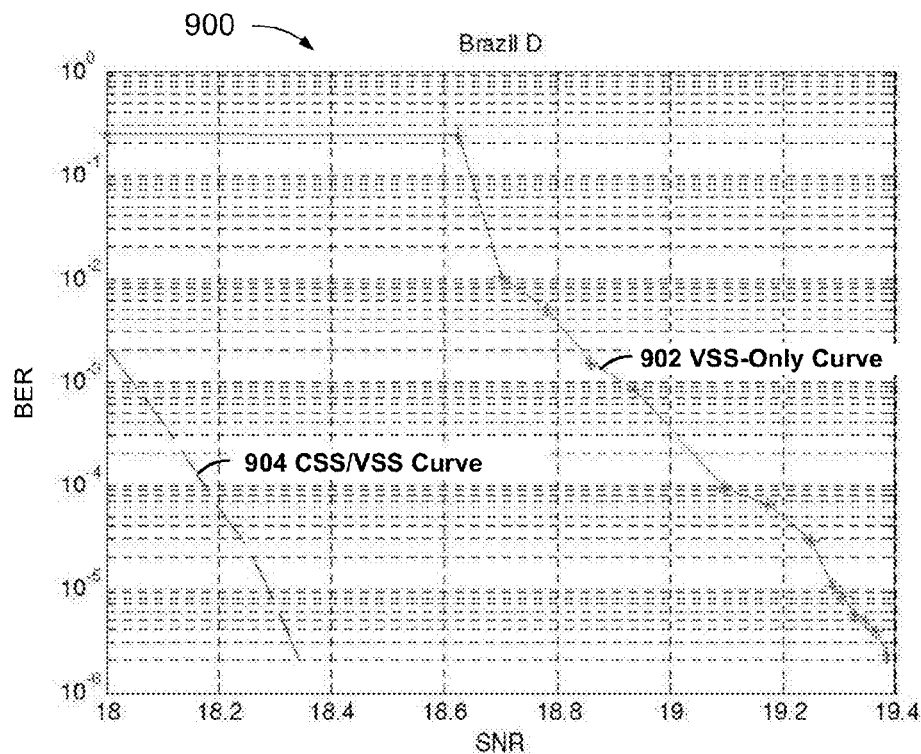
FIG. 9 is a plot of a BER/SNR curves for a receiver with VSS-only equalization and a receiver with CSS/VSS multi-mode equalization, for a Brazil channel D.

FIG. 9 is a plot 900 of a BER/SNR curve 902 for a receiver with VSS-only equalization, and a BER/SNR curve 904 for a receiver with CSS/VSS multi-mode equalization, for a Brazil channel D.

Figure 10:
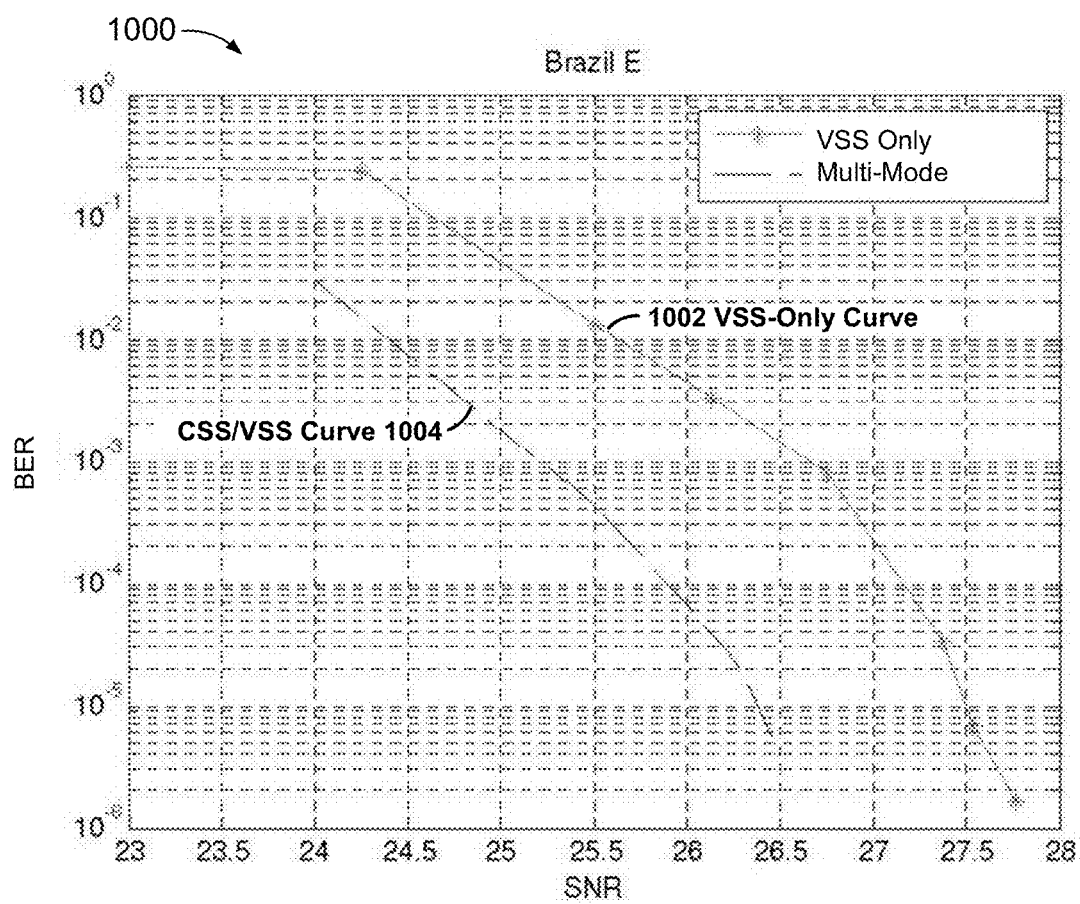
FIG. 10 is a plot of a BER/SNR curves for a receiver with VSS-only equalization and a receiver with CSS/VSS multi-mode equalization, for a Brazil channel E.

FIG. 10 is a plot 1000 of a BER/SNR curve 1002 for a receiver with VSS-only equalization, and a BER/SNR curve 1004 for a receiver with CSS/VSS multi-mode equalization, for a Brazil channel E.

In FIGS. 6 through 10, the bit error rate is lower for CSS/VSS multi-mode equalization over a range of SNRs for each of the corresponding channel conditions. The BER differences may translate to gains of approximately 1 dB relative to a VSS-only system.

Methods and systems disclosed herein are not limited to the examples of FIGS. 6 through 10.

Figure 11:
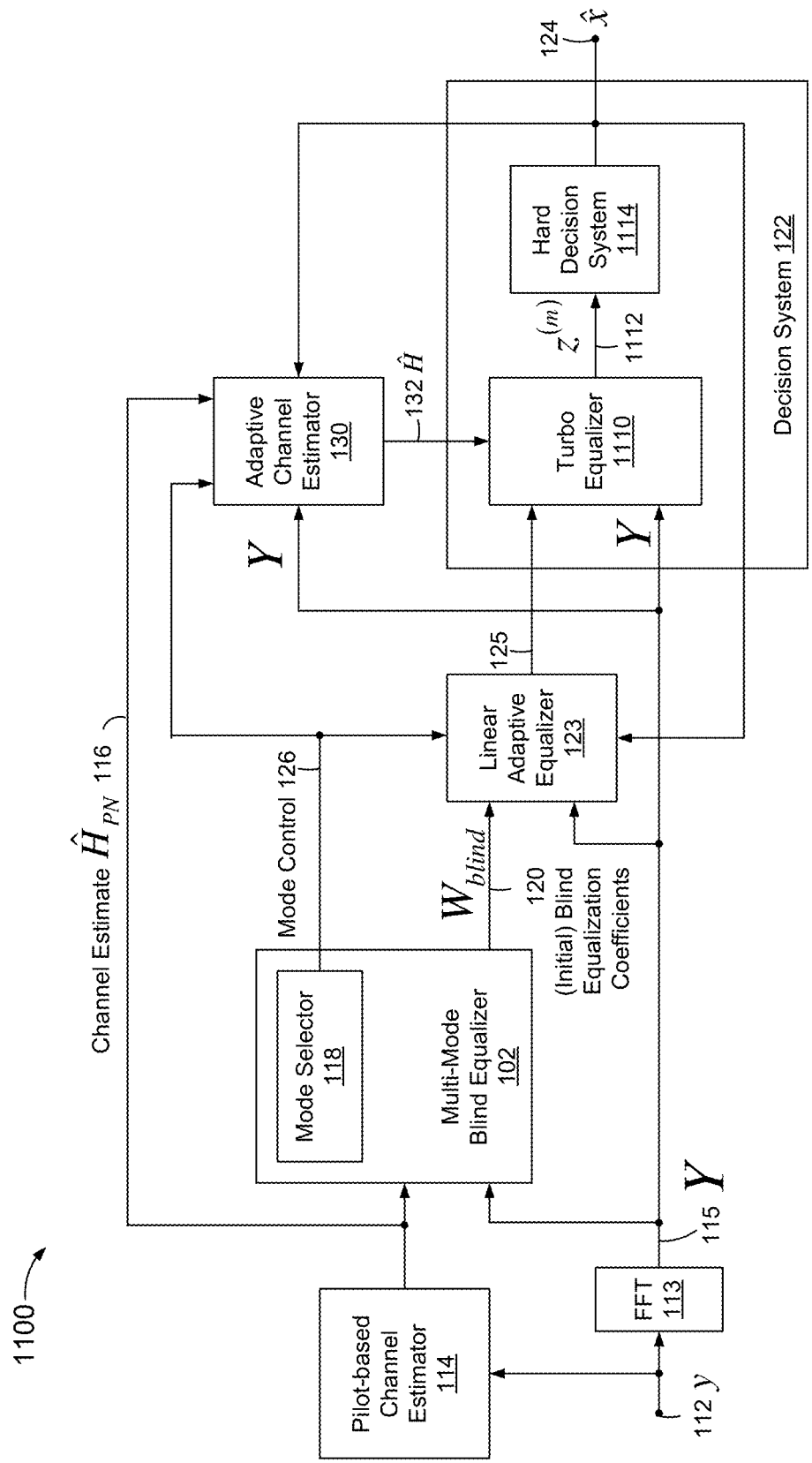
FIG. 11 is a block diagram of a system including an example implementation of a decision system of FIG. 1.

FIG. 11 is a block diagram of a system 1100, including an example implementation of decision system 122 of FIG. 1. Methods and systems disclosed herein are not, however, limited to the example of FIG. 11.

In FIG. 11, multi-mode blind equalizer 102 may be implemented as described in one or more examples above.

In FIG. 11, decision system 122 includes a turbo equalizer 1110 to generate estimated decisions $z^{(m)}$ 1112 regarding symbols of received signal 106 in FIG. 1.

Turbo equalizer 1110 may include a soft decision system to generate soft decisions and corresponding probabilities.

Turbo equalizer 1110 may further include a frequency domain equalizer to generate decision estimates 1112 based on outputs of the soft decision system and channel estimate $\hat{H}$ 132 and/or channel estimate $\hat{H}_{PN}$ 116. Turbo equalizer 1110 may be implemented to iteratively process blocks of linear adaptive equalizer outputs 125 or prior decisions 1112.

In FIG. 11, decision system 122 further includes a hard decision system 1114 to generate decisions 124 as hard decisions based on estimated decisions 1112. Hard decision system 1114 may include, for example, a Viterbi decoder.

Figure 12:
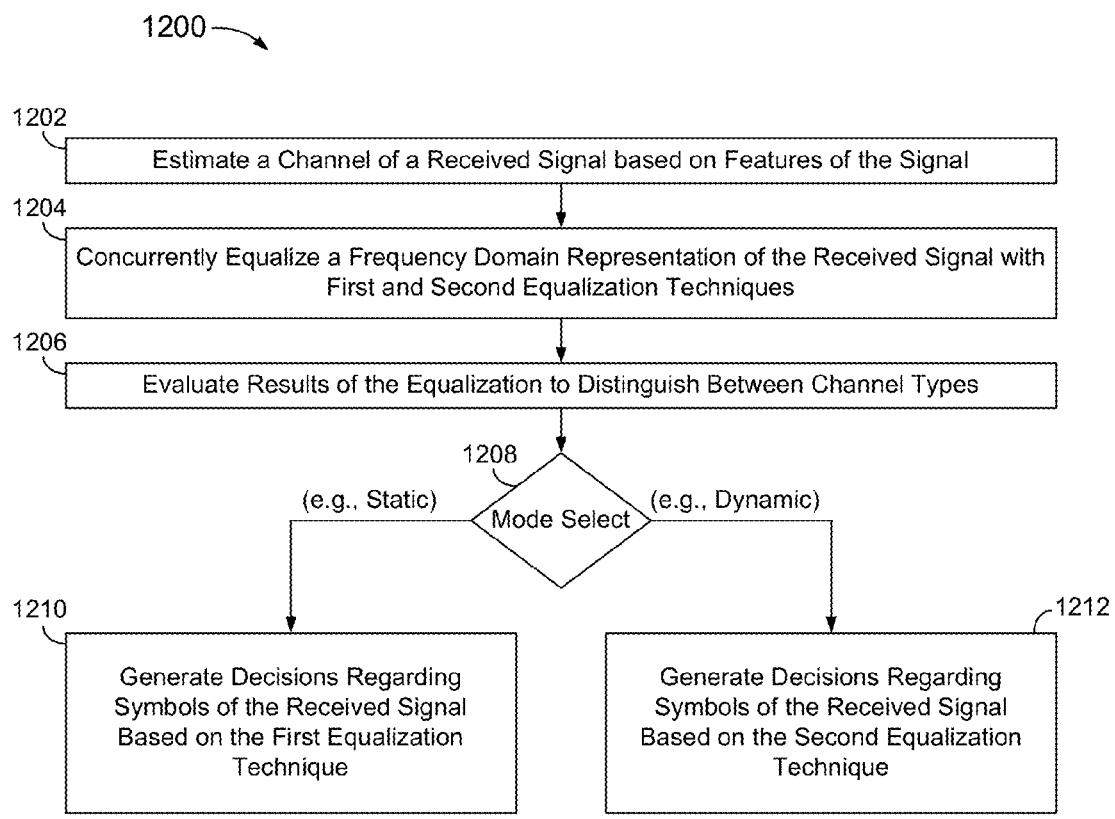
FIG. 12 is flowchart of a method of processing a received signal based on one of multiple selectable equalization techniques depending on a channel condition.

FIG. 12 is flowchart of a method 1200 of processing a received signal based on one of multiple selectable equalization techniques depending on a channel condition.

At 1202 an initial channel estimate is determined based on features of a received signal. The received signal may correspond to a single-carrier signal, such as a digital television signal. The channel estimate may be determined from pilot signals of the received signal, which may include pseudo-random (PN) sequences.

At 1204, a frequency domain representation of the received signal is equalized concurrently with each of first and second equalization techniques. The first and/or second equalization technique may include an adaptive blind equalization technique, and may be performed in the frequency domain.

At 1206, results of the equalization at 1204 are evaluated to distinguish between pre-defined channel types, such as to distinguish between a static channel and a dynamic channel. The evaluating may include determining whether one or more of the first and second equalization techniques have converged on a set of equalization coefficients or weights, which may be indicative of a channel condition or type. The evaluating may include evaluating MSEs of PN sequences contained in results of the equalization.

At 1208, a mode is selected based on the evaluation. The mode may be selected as appropriate mode for the channel type.

Where a first mode is selected at 1208, processing proceeds to 1210, where decisions regarding symbols of the received signal are generated based on the first equalization technique. Generating of the decisions at 1210 may include using equalization weights of the first equalization technique as initial linear adaptive equalization weights.

Where a second mode is selected at 1208, processing proceeds to 1212, where decisions regarding symbols of the received signal are generated based of the second equalization technique. Generating of the decisions at 1212 may include using equalization weights of the second equalization technique as initial linear adaptive equalization weights.

Figure 13:
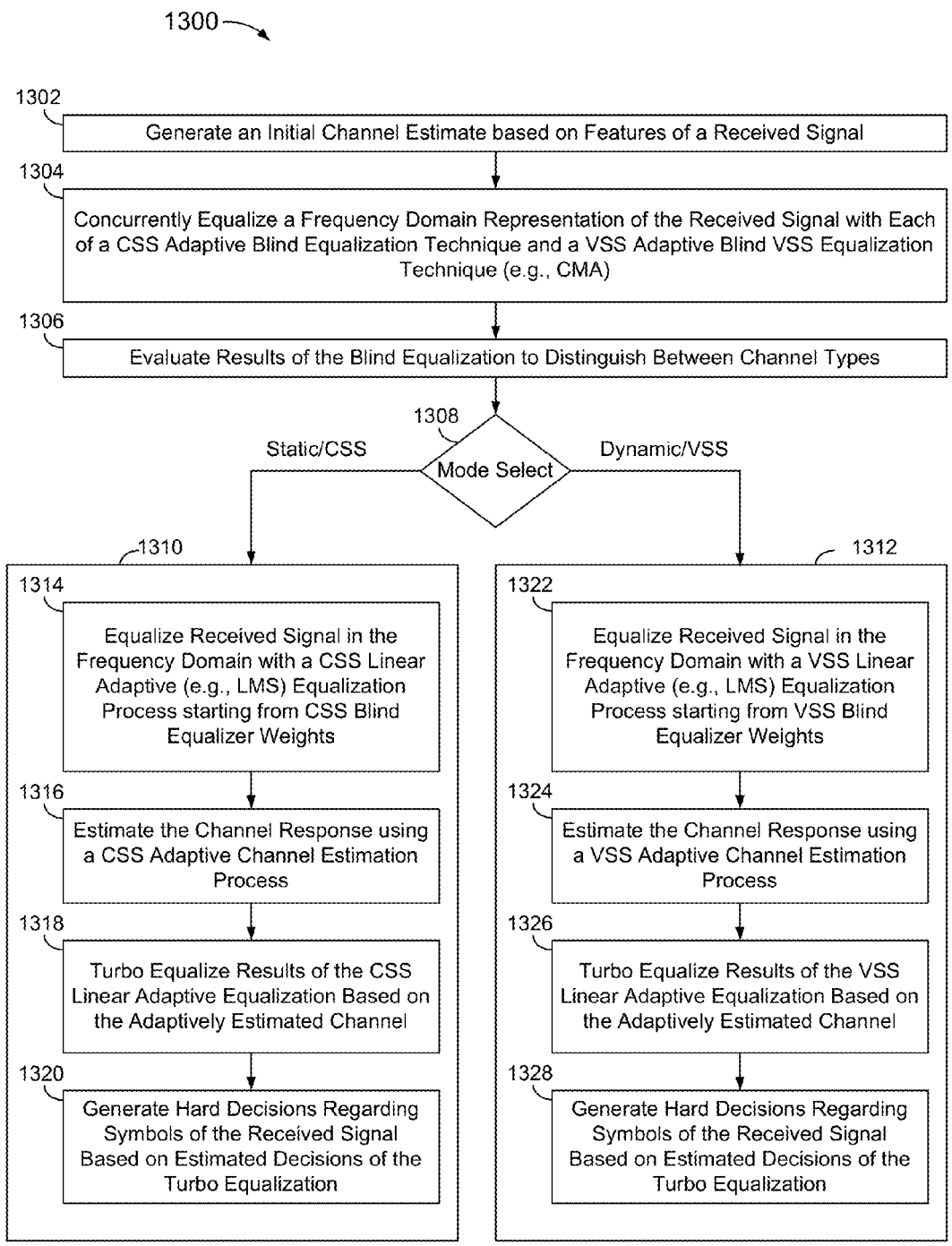
FIG. 13 is flowchart of a method of processing a received signal based on one of multiple selectable blind equalization techniques depending on a channel condition.

FIG. 13 is flowchart of a method 1300 of processing a received signal based on one of multiple selectable blind equalization techniques depending on a channel condition.

At 1302 an initial channel estimate is determined based on features of a received signal, such as described above with reference to 1202.

At 1304, a frequency domain representation of the received signal is equalized concurrently with each of a CSS adaptive blind equalization technique and a VSS adaptive blind equalization technique. The CSS and VSS adaptive blind equalization techniques may each include a CMA technique, a Sato algorithm technique, and/or a MMA technique.

The equalizing at 1304 may be performed in the frequency domain.

At 1306, results of the equalization at 1304 are evaluated to distinguish between pre-defined channel types, such as to distinguish between a static channel and a dynamic channel. The evaluating may include determining whether the CSS adaptive blind equalization technique has converged. The evaluating may include estimating MSEs of PN sequences contained in equalization results of the CSS and/or VSS adaptive blind equalization.

At 1308, a mode is selected based on the evaluation. The mode may be selected as an appropriate mode for the channel type.

Mode selection at 1308 may include comparing the MSE of the CSS equalization to a threshold, and/or comparing MSEs of the CSS and VSS equalizations to one another. When the MSE of the CSS equalization is below the threshold, or when a difference between the MSEs of the CSS and VSS equalizations is below a threshold, the channel may be static and processing may proceed to 1310. Otherwise, the channel may be dynamic and processing may proceed to 1312.

At 1310, decisions regarding symbols of the received signal may be generated using CSS adaptive blind equalization weights from 1304 as initial or starting linear adaptive equalization weights, such as described below with reference to 1314 through 1320.

At 1314, the received signal may be equalized with a CSS linear adaptive equalization process, which may include a least means squares (LMS) algorithm. Initial weights or coefficients for the LMS algorithm may be obtained from the CSS blind equalizer.

At 1316, a channel estimate may be computed. The channel estimate may be computed based on the initial channel estimate of 1302 and/or with a CSS adaptive decision-directed algorithm. At 1318, results of the CSS linear adaptive equalization at 1314 may be turbo equalized to generate decision estimates regarding transmitted symbols, based on the channel estimation of 1316.

At 1320, hard decisions may be generated from the decision estimates of 1318.

At 1312, decisions regarding symbols of the received signal may be generated using VSS adaptive blind equalization weights from 1304 as initial or starting linear adaptive equalization weights. Decision generation at 1320 may include VSS linear adaptive equalization at 1322, channel estimation at 1324, turbo equalization at 1326, and hard decision generation at 1328.

Method 1200 and/or method 1300 may include re-evaluating blind equalization results to detect a change in channel condition such as described below with reference to FIG. 14.

Figure 14:
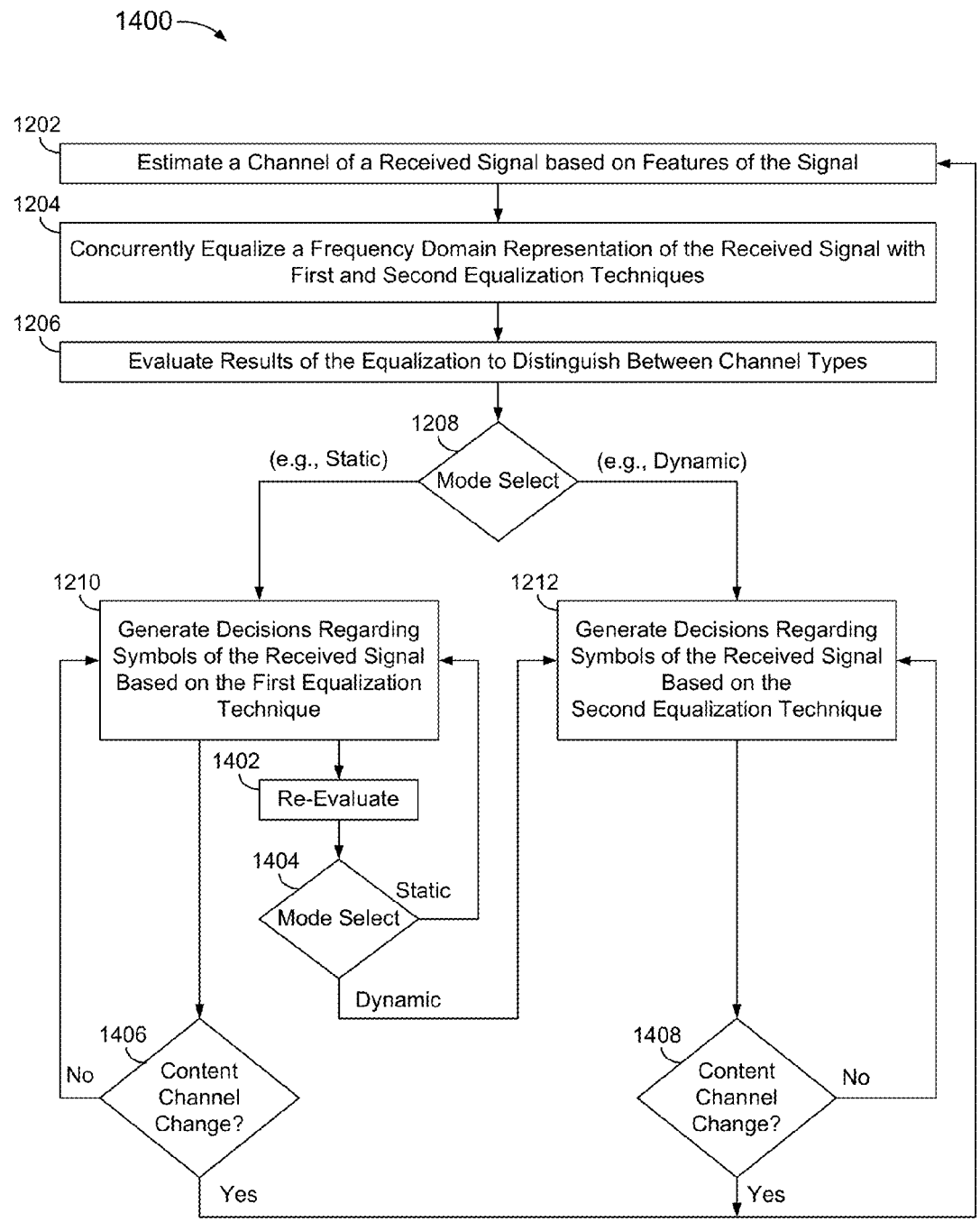
FIG. 14 is flowchart of a method of processing a received signal based on one of multiple selectable equalization blind techniques depending on a channel condition, including re-evaluating the channel condition.

FIG. 14 is flowchart of a method 1400 of processing a received signal based on one of multiple selectable equalization techniques depending on a channel condition, including re-evaluating the channel condition.

In the example of FIG. 14, method 1400 includes 1202 through 1212 of method 1200. Alternatively, method 1400 may include 1302 through 1312 of method 1300.

In FIG. 14, while generating symbol decisions at 1210, the channel type may be re-evaluated at 1402. Where the channel remains unchanged, processing may remain at 1210. Where the channel has changed, processing may switch to 1212 to generate the symbol decisions based on the second equalization technique.

Where the first and second equalization techniques run concurrently, switching from 1210 to 1212 at 1404 may be substantially instantaneous.

As an example, when a channel is static, symbol decisions may be determined at 1210, using CSS adaptive blind equalization weights as initial linear adaptive equalization weights such as described above with reference to 1310. If the channel is subsequently determined to be dynamic at 1402 and 1404, processing may switch 1212 to determine symbol decisions using VSS adaptive blind equalization weights as initial linear adaptive equalization weights such as described above with reference to 1312.

When CSS adaptive blind equalization diverges due to dynamic conditions of a channel, the adaptive CSS blind equalization may not thereafter converge even if the channel subsequently becomes static. Thus, when generating symbol decisions at 1212 or 1312, the channel type may not be re-evaluated as at 1402. The channel type may, however, be re-evaluated at 1408 as described below.

A received signal may include multiple content channels or stations, which may correspond to digital television channels. When a content channel is changed at 1406 or 1408, processing may return to 1202, where blind equalization results for the new content channel are evaluated.

Method 1400 may be initiated, for example, upon a power-up of a digital television receiver system, and may be performed with respect to a selected digital television channel. Upon a change of television channel at 1406 or 1408, processing may return to 1206 to re-evaluate the new signal channel.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Methods and systems disclosed herein may be implemented with respect to one or more of a variety of systems including one or more consumer systems, such as described below with reference to FIG. 15. Methods and systems disclosed herein are not, however, limited to the example of FIG. 15.

Figure 15:
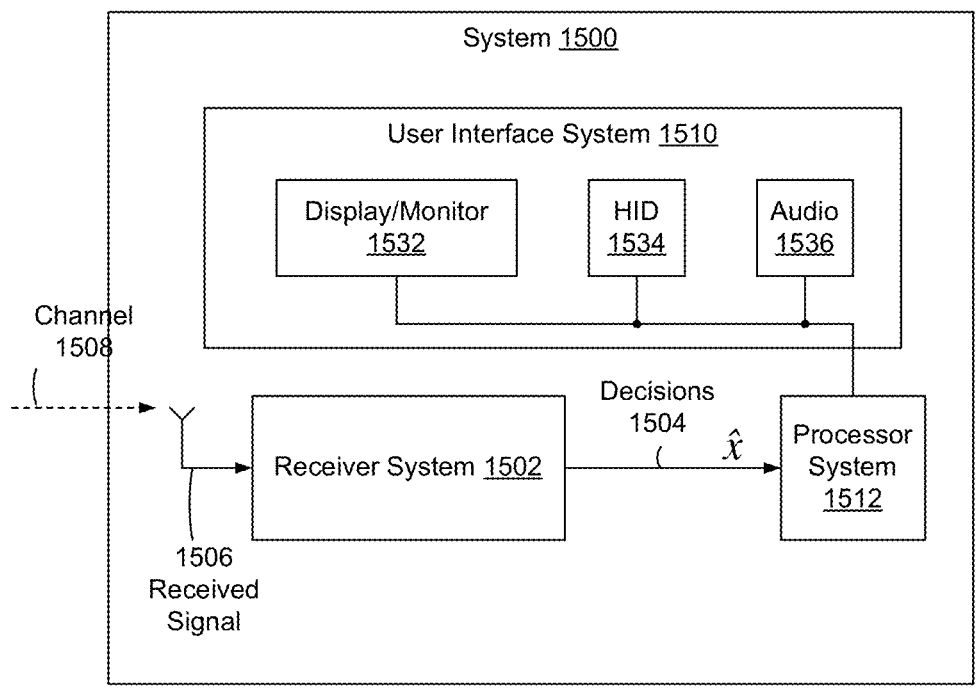
FIG. 15 is a block diagram of a system including a receiver system to decode symbols or decisions.

FIG. 15 is a block diagram of a system 1500 including a receiver system 1502 to decode symbols or decisions 1504 from a signal 1506 received over a channel 1508. Receiver system 1502 may be implemented as described in one or more examples herein.

System 1500 may include a user interface system 1510 and a digital processor system 1512 to process decisions 1504 and output corresponding information to user interface system 1510.

System 1500 or portions thereof may be implemented within one or more integrated circuit dies, and may be implemented as a system-on-a-chip (SoC).

User interface system 1510 may include a monitor or display 1532 to display information from digital processor system 1512.

User interface system 1510 may include a human interface device (HID) 1534 to provide user input to digital processor system 1512. HID 1534 may include, for example and without limitation, one or more of a key board, a cursor device, a touch-sensitive device, and or a motion and/or image sensor. HID 1534 may include a physical device and/or a virtual device, such as a monitor-displayed or virtual keyboard.

User interface system 1510 may include an audio system 1536 to receive and/or output audible sound.

System 1500 may further include a transmitter system to transmit signals from system 1500.

System 1500 may correspond to, for example, a computer system, a personal communication device, and/or a television set-top box.

System 1500 may include a housing to receive one or more of receiver system 1502, digital processor system 1512, user interface system 1510, or portions thereof. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, receiver system 1502 may be implemented to receive a digital television broadcast signal, and system 1500 may include a set-top box housing or a portable housing, such as a mobile telephone housing.

Figure 16:
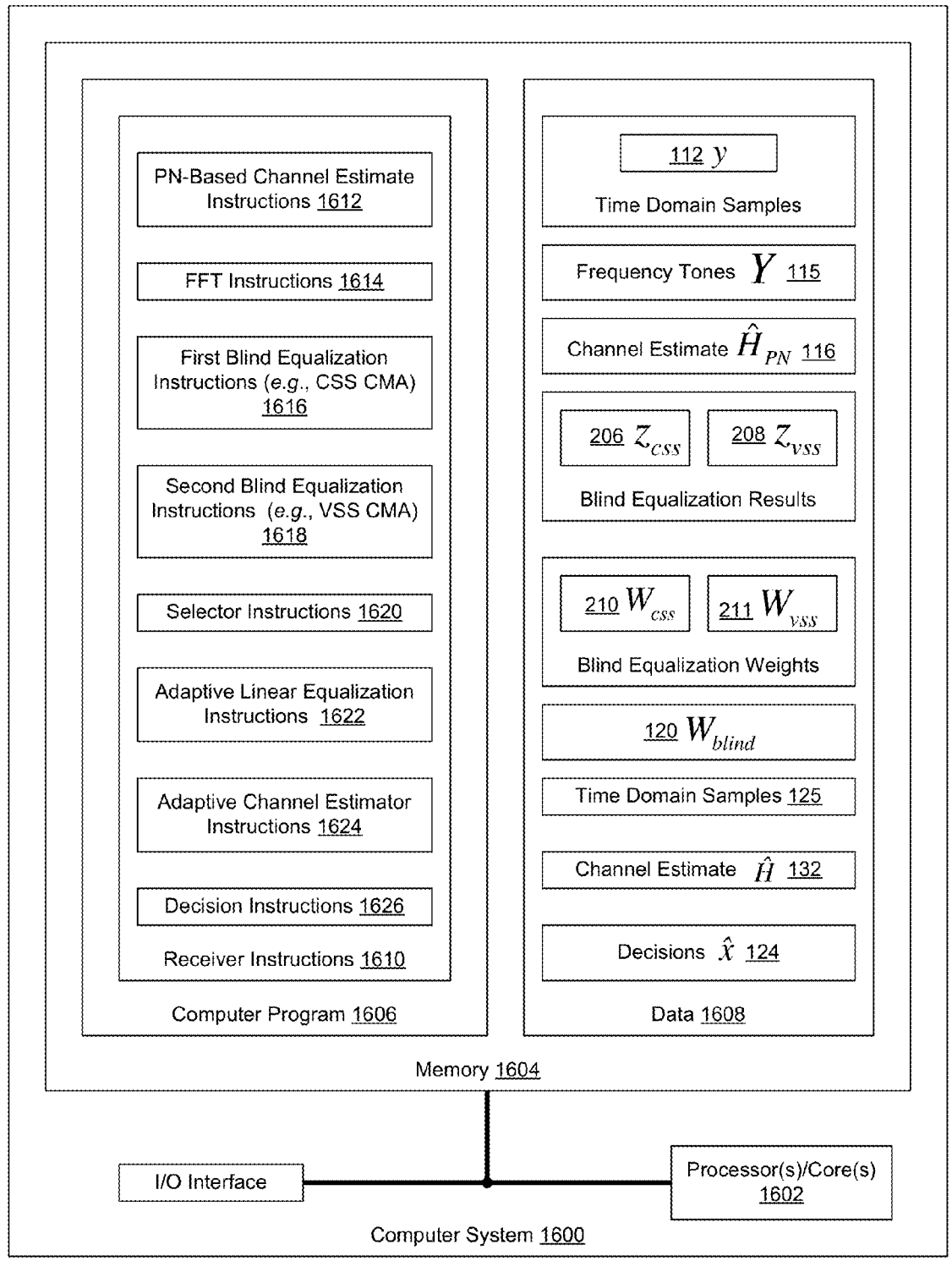
FIG. 16 is a block diagram of a computer system configured to generate decisions regarding symbols of a signal received over a channel using multiple equalization techniques optimized to various channel conditions.

FIG. 16 is a block diagram of a computer system 1600, configured to generate decisions $\hat{x}$ 124 regarding symbols of a signal received over a channel using multiple equalization techniques optimized to various channel conditions.

Computer system 1600 includes one or more computer instruction processing units and/or processor cores, illustrated here as a processor 1602, to execute computer readable instructions, also referred to herein as computer program logic.

Computer system 1600 may include memory, cache, registers, and/or storage, illustrated here as memory 1604, which may include a non-transitory computer readable medium encoded with a computer program, illustrated here as a computer program 1606.

Memory 1604 may include data 1608 to be used by processor 1602 in executing computer program 1606, and/or generated by processor 1602 in response to execution of computer program 1606.

In the example of FIG. 16, computer program 1606 includes receiver instructions 1610 to cause processor 1602 to generate decisions $\hat{x}$ 124 based on time domain samples y 112 of received signal 106 in FIG. 1.

Instructions 1610 may include PN-based channel estimate instructions 1612 to cause processor to estimate an initial channel frequency response $\hat{H}_{PN}$ 116, such as described in one or more examples above.

Instructions 1610 may include FFT instructions 1614 to cause processor to translate domain samples y 112 to frequency domain representation Y 115.

Instructions 1610 may include first blind equalization technique instructions 1616, which may include CSS CMA blind equalization instructions to cause processor 1602 to generate frequency domain tones $z_{CSS}$ 206 based on equalization weights $W_{CSS}$ 210, such as described in one or more examples above.

Instructions 1610 may include second blind equalization technique instructions 1616, which may include VSS blind equalization instructions to cause processor 1602 to generate frequency domain tones $z_{VSS}$ 208 based on equalization weights $W_{VSS}$ 211, such as described in one or more examples above.

Instructions 1610 may include selector instructions 1620 to cause processor 1602 to select one of weights 210 and 211 as initial adaptive linear equalization weights $W_{blind}$ 120, such as described in one or more examples above.

Instructions 1610 may include adaptive linear equalization instructions 1622 to cause processor 1602 to equalize frequency domain representation Y 115 to generate time domain samples 125, such as described in one or more examples above.

Instructions 1610 may include adaptive channel estimator instructions 1624 to cause processor 1602 to generate estimate $\hat{H}$ 132 of channel 108 (FIG. 1), such as described in one or more examples above.

Instructions 1610 may include decisions instructions 1626 to cause processor 1602 to determine decisions 124 based on frequency domain representation Y 115, time domain samples 125, and channel estimate $\hat{H}$ 132, such as described in one or more examples above.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. An apparatus to receive a signal over a channel, comprising:
   a first channel estimator to estimate the channel based on PN sequences of the signal;
   first and second adaptive blind equalizers to concurrently equalize a frequency domain representation of the received signal;
   a selector to select weights of one of the first and second adaptive blind equalizers based on a condition of the channel;
   a linear adaptive equalizer to equalize the frequency domain representation of the received signal, including to apply the selected weights as initial linear adaptive equalizer weights and to adapt the initial linear adaptive equalizer weights based on equalization results of the linear adaptive equalizer; and
   a decision system to generate decisions regarding the symbols based in part on the equalization results of the linear adaptive equalizer.

2. The apparatus of claim 1, wherein:
   the first adaptive blind equalizer includes a constant step size (CSS) adaptive blind equalizer; and
   the second adaptive blind equalizer includes a variable step size (VSS) adaptive blind equalizer.

3. The apparatus of claim 2, wherein the selector is implemented to select the weights of the CSS adaptive blind equalizer when the channel is static, and to select the weights of the VSS adaptive blind equalizer when the channel is dynamic.

4. The apparatus of claim 3, wherein the selector is further implemented to distinguish between a static channel and a dynamic channel based on an estimated mean square error determined from pseudo-random sequences in equalization results of one or more of the CSS and VSS adaptive blind equalization techniques.

5. The apparatus of claim 2, wherein the selector is implemented to:
   select the weights of the CSS adaptive blind equalizer when the CSS adaptive blind equalizer converges on a solution; and
   select the weights of the VSS adaptive blind equalizer when the CSS adaptive blind equalizer diverges from a solution.

6. The apparatus of claim 1, wherein the linear adaptive equalizer is controllable to operate in a CSS mode when the weights of the first adaptive blind equalizer are selected, and to operate in a VSS mode when the weights of the second adaptive blind equalizer are selected.

7. The apparatus of claim 1, further including:
   an adaptive channel estimator to adaptively estimate the channel in a CSS mode when the weights of the first adaptive blind equalizer are selected, and in a VSS mode when the weights of the second adaptive blind equalizer are selected, including to apply the PN based channel estimate as an initial channel estimate, and adapt the initial channel estimate based on prior decisions.

8. A non-transitory computer readable medium encoded with a computer program, including instructions to cause a processor to:
   estimate a channel of a received signal based on PN sequences of the signal;
   equalize a frequency domain representation of the received signal with first and second adaptive blind equalization techniques concurrently with one another;
   select weights of one of the first and second adaptive blind equalization techniques based on a condition of the channel;
   equalize the frequency domain representation of the received signal with a an adaptive linear equalization technique, including to apply the selected weights as initial linear adaptive equalization weights and to adapt the initial linear adaptive equalization weights based on linear adaptive equalization results; and
   a decision system to generate decisions regarding the symbols based in part on the linear adaptive equalization results.

9. The computer readable medium of claim 8, wherein:
   the first adaptive blind equalization technique includes a constant step size (CSS) adaptive blind equalization technique; and
   the second adaptive blind equalization technique includes a variable step size (VSS) adaptive blind equalization technique.

10. The computer readable medium of claim 9, wherein the instructions include instructions to cause the processor to:
    select the weights of the CSS adaptive blind equalization technique when the channel is static, and to select the weights of the VSS adaptive blind equalizer when the channel is dynamic.

11. The computer readable medium of claim 10, wherein the instructions include instructions to cause the processor to:
    distinguish between a static channel and a dynamic channel based on an estimated mean square error determined from pseudo-random sequences in equalization results of one or more of the first and second adaptive blind equalization techniques.

12. The computer readable medium of claim 9, wherein the instructions include instructions to cause the processor to:
    select the weights of the CSS adaptive blind equalization technique when the CSS adaptive blind equalization technique converges; and
    select the weights of the VSS adaptive blind equalization technique when the CSS adaptive blind equalization technique diverges from a solution.

13. The computer readable medium of claim 8, wherein the instructions include instructions to cause the processor to:
    perform the linear adaptive equalization technique in a CSS mode when the weights of the first adaptive blind equalization technique are selected, and in a VSS mode when the weights of the second adaptive blind equalization technique are selected.

14. The computer readable medium of claim 8, further including instructions to cause the processor to:
    adaptively estimate the channel in a CSS mode when the weights of the first adaptive blind equalization technique are selected, and in a VSS mode when the weights of the second adaptive blind equalization technique are selected, including to apply the PN based channel estimate as an initial channel estimate and to adapt the initial channel estimate based on prior decisions.

15. A system, comprising:
    a receiver system, including,
    a first channel estimator to estimate a channel of a received signal based on PN sequences of the signal,
    first and second adaptive blind equalizers to concurrently equalize a frequency domain representation of the received signal,
    a selector to select weights of one of the first and second adaptive blind equalizers based on a condition of the channel,
    a linear adaptive equalizer to equalize the frequency domain representation of the received signal, including to apply the selected weights as initial linear adaptive equalizer weights and to adapt the initial linear adaptive equalizer weights based on equalization results of the linear adaptive equalizer, and a decision system to generate decisions regarding the symbols based in part on the equalization results of the linear adaptive equalizer;

a digital processor system to process the symbol decisions and output corresponding information to a user interface system; and a housing;

wherein the receiver system and the digital processor system are positioned within the housing.

16. The system of claim 15, wherein:
the signal includes a digital video broadcast signal;
the digital signal processor system includes a digital video signal processor to process the decisions and output corresponding video and audio information to the user interface system; and
the housing includes a television set-top box.

17. The system of claim 15, wherein:
the signal includes a digital video broadcast signal;
the digital signal processor system includes a digital video signal processor to process the decisions and output corresponding video and audio information to the user interface system;
the user interface system includes a display, an audio system, and a human interface device (HID) to receive user input;
the housing includes a portable housing; and
the receiver system, the digital processor system, the user interface system, and a battery are positioned within the housing.

18. The system of claim 15, wherein:
the first adaptive blind equalizer includes a constant step size (CSS) adaptive blind equalizer;
the second adaptive blind equalizer includes a variable step size (VSS) adaptive blind equalizer; and
the selector is implemented to select the weights of the CSS adaptive blind equalizer when the channel is static, and to select the weights of the VSS adaptive blind equalizer when the channel is dynamic.

19. The system of claim 15, wherein the linear adaptive equalizer is controllable to operate in a CSS mode when the weights of the first adaptive blind equalizer are selected, and in a VSS mode when the weights of the second adaptive blind equalizer are selected.

20. The system of claim 15, further including:
an adaptive channel estimator to adaptively estimate the channel in a CSS mode when the weights of the first adaptive blind equalizer are selected, and in a VSS mode when the weights of the second adaptive blind equalizer are selected, including to apply the PN based channel estimate as an initial channel estimate, and adapt the initial channel estimate based on prior decisions.

* * * * *